United States Patent
Zeanah

(10) Patent No.: US 11,993,441 B2
(45) Date of Patent: May 28, 2024

(54) REUSABLE BLISTER PACKAGE ASSEMBLY

(71) Applicant: American Accessories International LLC, Knoxville, TN (US)

(72) Inventor: David Zeanah, Knoxville, TN (US)

(73) Assignee: American Accessories International LLC, Knoxville, TN (US)

( * ) Notice: Subject to any disclaimer, the term of this patent is extended or adjusted under 35 U.S.C. 154(b) by 0 days.

(21) Appl. No.: 17/976,999

(22) Filed: Oct. 31, 2022

(65) Prior Publication Data

US 2023/0047966 A1  Feb. 16, 2023

Related U.S. Application Data

(62) Division of application No. 17/210,697, filed on Mar. 24, 2021, now Pat. No. 11,485,558.

(60) Provisional application No. 62/994,266, filed on Mar. 24, 2020.

(51) Int. Cl.
*B65D 73/00* (2006.01)
*B65D 75/36* (2006.01)
*B65D 75/52* (2006.01)

(52) U.S. Cl.
CPC ......... *B65D 75/366* (2013.01); *B65D 75/522* (2013.01)

(58) Field of Classification Search
CPC ........... B65D 73/0042; B65D 73/0085; B65D 75/30; B65D 75/366; B65D 75/522
USPC ......... 206/461–467, 469–471, 775–778, 782
See application file for complete search history.

(56) References Cited

U.S. PATENT DOCUMENTS

| | | | | |
|---|---|---|---|---|
| 2,850,160 A * | 9/1958 | Siebel | ................. | B65D 75/522 |
| | | | | D9/701 |
| 3,339,721 A * | 9/1967 | Goldstein | ............. | B65D 33/02 |
| | | | | 206/583 |
| 3,407,928 A * | 10/1968 | Watts, Jr. | ............... | B65D 75/26 |
| | | | | 206/463 |
| 3,503,492 A * | 3/1970 | Marsh | .................... | B65D 75/30 |
| | | | | 206/214 |
| 4,456,124 A * | 6/1984 | Kay | .................... | B65D 73/0057 |
| | | | | 206/463 |
| 5,817,353 A * | 10/1998 | Guarino | ................. | A23B 4/064 |
| | | | | 426/396 |
| 5,888,565 A * | 3/1999 | Gics | ................... | B65D 77/0433 |
| | | | | 206/769 |
| 6,471,053 B1 * | 10/2002 | Feibelman | ................ | A47F 7/02 |
| | | | | 206/495 |
| 2005/0147328 A1 * | 7/2005 | Cheaure | ................. | B65D 31/12 |
| | | | | 206/466 |

(Continued)

*Primary Examiner* — Luan K Bui
(74) *Attorney, Agent, or Firm* — Troutman Pepper Hamilton Sanders LLP; Christopher C. Close, Jr.; Jacob M. Burr

(57) ABSTRACT

The disclosed technology includes blister package assemblies that include a reusable blister pouch. The blister package assembly can have an enclosure housing having a first card and a second card. The second card can be opposed to a separably joinable to the first card. The blister package assembly can have a reusable blister pouch that can enclose an object and have a fastener that transition the reusable blister pouch between an open configuration and a closed configuration. The reusable blister pouch can be secured between the opposing first and second cards when the first and second cards are joined and a portion of the reusable blister pouch can displayed through an opening of the first card and/or the second card.

16 Claims, 4 Drawing Sheets

(56) References Cited

U.S. PATENT DOCUMENTS

| | | | |
|---|---|---|---|
| 2010/0012531 A1* | 1/2010 | Steele | B65D 33/007 |
| | | | 206/216 |
| 2011/0142377 A1* | 6/2011 | Bradley | B32B 27/10 |
| | | | 383/106 |
| 2018/0244097 A1* | 8/2018 | Bassett | B42D 15/045 |
| 2019/0337699 A1* | 11/2019 | Herrington | B65D 75/527 |

* cited by examiner

REUSABLE BLISTER PACKAGE ASSEMBLY

CROSS-REFERENCE TO RELATED APPLICATIONS

This application is a divisional application of U.S. Non-Provisional patent application Ser. No. 17/210,697, filed 24 Mar. 2021 which claims the benefit of U.S. Provisional Patent Application No. 62/994,266 filed 24 Mar. 2020, the entire contents of which are hereby incorporated by reference as if fully set forth below.

FIELD OF TECHNOLOGY

Embodiments of the present disclosure relate generally to blister package systems, and, more particularly, to a reusable blister package assembly.

BACKGROUND

Display packages are commonly used to display and protect merchandise sold in stores or other commercial settings. Examples of display packages for displaying merchandise in a commercial setting are known, and examples of such are known to those of skill in the art.

One type of display package that is commonly used in commercial settings is a trapped blister assembly or blister package. Commonly, a trapped blister assembly includes one or two printable parts or the "card" (typically made of laminated paper layers or a rigid polymer) and one or two transparent or translucent rigid parts (typically a rigid polymer) called a "blister" that hold the product within/between them. These parts are assembled together in industry using numerous technologies such as cold sealing, heat sealing, high frequency sealing, or radio frequency sealing. Through pressure and one of these methods or apparatuses of adhesion, the product can be secured within the blister, which is "trapped" or positioned between the two cards (or folded single card) so that it cannot be removed without destroying the card and/or cutting into the clear rigid blister.

Neither the card nor blister has any substantial use to the consumer after the product is removed and such packaging typically is discarded either through waste or recycling channels. As will be appreciated, this discarded packing creates substantial waste.

SUMMARY

The disclosed technology relates to sustainable blister cards that reduce or eliminate waste generated by the use of conventional blister cards. In particular, the disclosed technology relates to a reusable blister package assembly. The disclosed technology can include a packaging container that can have an enclosure housing and a reusable blister pouch. The enclosure housing can include a first card and a second card. The second card can be opposed to and separably joinable to the first card.

The reusable blister pouch can be configured to enclose an object by having a fastener that can transition the reusable blister pouch from an open configuration to a closed configuration. The reusable blister pouch can be secured between the opposing first and second cards when the first and second cards are in a joined configuration. At least one of the first card or the second card of the enclosure housing can include an opening configured to display at least a portion of the reusable blister pouch.

At least a portion of the reusable blister pouch can comprise one or more transparent materials that can be configured to display at least a portion of the object. The reusable blister pouch can be at least partially composed of an opaque material and the reusable blister pouch can include a transparent window configured to display at least a portion of the object.

The first and second cards can be constructed from a continuous piece of material and joined by a hinge such that the first and second cards can be folded along the hinge to form the enclosure housing. The first and second cards can be at least partially composed of paper material. The first card can include a slot that can receive at least a portion of the reusable blister pouch and the second card can include a protrusion that can support the reusable blister pouch when the reusable blister pouch is secured between the opposing first and second cards.

The fastener of the reusable blister pouch can be a zipper or a snap fastener.

The disclosed technology can include a packaging container having an enclosure housing and a reusable blister pouch. The enclosure housing can have a first card and a second card. The second card can be opposed to and separably joinable to the first card. At least one of the first card and the second card can define an aperture of the enclosure housing.

The reusable blister pouch can be positioned within the aperture of the enclosure housing and include an inner cavity and a fastener. The fastener can be configured to facilitate opening and closing of the reusable blister pouch. An object can be positioned within the inner cavity of the reusable blister pouch and at least partially positioned within the aperture of the enclosure housing.

The first and second cards of the enclosure housing can be joined around the reusable blister pouch and secure the reusable blister pouch such that the object can be at least partially positioned within the aperture of the enclosure housing.

At least a portion of the reusable blister pouch can comprise one or more transparent materials configured to display at least a portion of the object. The reusable blister pouch can be at least partially composed of an opaque material and the reusable blister pouch can include a transparent window to display at least a portion of the object.

The first and second cards can comprise a continuous piece of material that is configured to foldably join the first and second cards to form the enclosure housing. The first and second cards can be at least partially composed of paper material. The fastener of the reusable blister pouch can be a zipper.

The disclosed technology can include a packaging container having a card and a reusable blister pouch. The card can include a foldable tab. The reusable blister pouch can be configured to enclose an object by having a fastener that is configured to transition the reusable blister pouch from an open configuration to a closed configuration. The reusable blister pouch can be secured to the card by the foldable tab and the card can include an opening that can display at least a portion of the reusable blister pouch.

At least a portion of the reusable blister pouch can include one or more transparent materials to display at least a portion of the object. The reusable blister pouch can be at least partially composed of an opaque material and include a transparent window to display at least a portion of the object. The card can be at least partially composed of paper material and the fastener can be a zipper.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate the presently disclosed subject matter and serve to explain the principles of the presently disclosed subject matter. The drawings are not intended to limit the scope of the presently disclosed subject matter in any manner.

DETAILED DESCRIPTION

Figure 1:
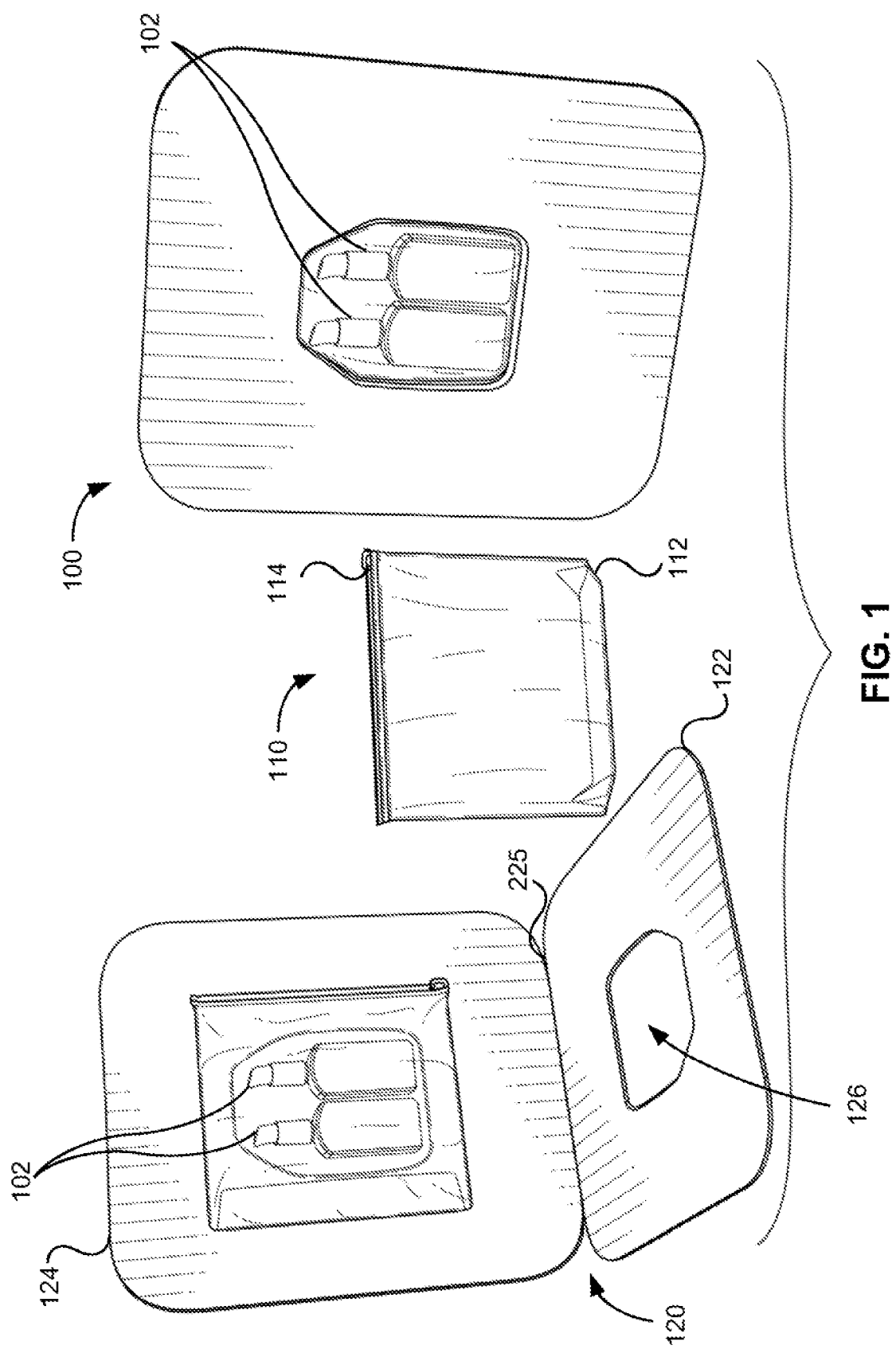
FIG. 1 is a blister package assembly having a reusable blister pouch, in accordance with the disclosed technology.

The disclosed technology includes blister package assemblies including at least a portion of reusable blister package. In particular, the disclosed technology includes a reusable bag or pouch that can replace existing disposable blisters and can be used by the consumer for other purposes. As will be appreciated, the disclosed blister package assembly still allows for a product to be visible while on display at a retail location, as with known blister packaging. But unlike known blister packaging, the disclosed technology provides a reusable, portable, and flexible bag or pouch that has extended or repurposed value after opening the blister card packaging. For example, the blister can be a reusable bag or pouch that is made of transparent material or has a transparent portion of material such that an object inside of the bag or pouch can be viewed. In this way, the blister package can protect the merchandise during shipment and display in a commercial setting while also making it possible for the merchandise to be viewed while in the blister package. Furthermore, once the blister package has been opened, the consumer can reuse the blister for other purposes (e.g., storing or toting other objects in the blister).

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

Reference is now made to the drawings, in which like numerals represent like elements, where the present disclosure is herein described. As shown in FIG. 1, embodiments of the disclosed technology can include a blister package assembly 100 having a reusable blister pouch 110 and an enclosure housing 120. The enclosure housing 120 can be formed by fastening a first blister card 122 to a second blister card 124 and placing the reusable blister pouch 110 between the first blister card 122 and the second blister card 124 to form the blister package assembly 100. The blister package assembly 100 can be arranged such that an object 102, for example, merchandise on display or offered for sale in a commercial setting, can be viewed by someone viewing the blister package assembly 100. Furthermore, the blister package assembly 100 can be configured to protect the object 102 from damage during shipment, storage, display, or even tampering by a potential shoplifter. As will be described in greater detail herein, and as will be appreciated, the blister package assembly 100 can reduce waste produced as a common byproduct of blister packages by including the reusable blister pouch 110 that can be reused by a consumer for purposes other than simply displaying the object 102 in a commercial setting.

As is further shown in FIG. 1, in various embodiments, reusable blister pouch 110 can include a pouch 112 having a fastener 114 configured to facilitate opening and closing of the pouch 112. For example, the fastener 114 can be a zipper (press- or slide-type zippers), a hook and loop fastener (such as Velcro®, touch fastener, hook-and-pile fastener, slidingly engaging fastener, Dual Lock®, Duotec®, etc.), a snap fastener, a press fit, straps, buttons, magnets, spring bands, flap tucking, a snap-fit connector, sticky tape or other sticky material, female to male connectors, hooks, a belt and buckle, a drawstring and/or any other suitable type of fastener for the application. The pouch 112 can be made from a transparent material or from a mesh material such that an object can be visible when placed inside of the pouch 112. The pouch 112 can be a simple bag or sack, as illustrated in FIG. 1, or the pouch 112 can be any type of container or configuration sufficient to store an object. For example, in certain embodiments, the pouch 112 can include one or more compartments and be made from a soft or rigid material. As non-limiting examples, the reusable blister pouch 110 can be made of numerous materials, natural or synthetic, including, but not limited to cotton, hemp, polypropylene (PP, woven or non-woven), Nylon, polyester, Tyvek, flexible polyethylene terephthalate (PET), flexible polyethylene (PE), polyvinyl chloride (PVC), ethylene-vinyl acetate (EVA), paper, aluminum, glass, metals, or composite materials.

As will be appreciated, the reusable blister pouch 110 of the present disclosure can be configured such that it can be reused for purposes other than simply displaying the object 102 in a commercial setting. For example, and not limitation, the reusable blister pouch 110 can be used for storing, toting, or protecting the object 102 even after the blister package assembly 100 has been opened. Furthermore, the reusable blister pouch 110 can be used for storing objects other than the object 102 that was originally stored in the blister package assembly 100 when the object 102 was purchased. For example, a consumer may purchase the object 102 (a product) and, after opening the blister package assembly 100, the consumer can continue to use the reusable blister pouch 110 for other purposes long after the object 102 has been consumed. In this way, the disclosed technology can reduce the amount of waste common to blister packaging.

According to various embodiments, the reusable blister pouch 110 can be formed using any suitable manufacturing method, including, but not limited to friction, liquid adhesion, heat welding, pressure adhesion, high frequency, tacking (with metal or plastic tacks/staples), sewing, etc. The first card 122 and the second card 124 can be made from the same material or the first card 122 and the second card 124 can be made from different materials. As non-limiting examples, the first card 122 and the second card 124 can be made from printable, recyclable material such as paper, paperboard, fiberboard, corrugated cardboard, polyethylene terephthalate (PET), high-density polyethylene (HDPE), aluminum, glass, metals, composite materials, or any other suitable material for the application. Furthermore, certain embodiments can employ a unitary card comprising conjoined first and second cards 122, 124 made from a single continuous piece of material that can include a hinge 225 composed of, for example, a score line, perforations, a crease, a fold, or any other similar type of manufacturing treatment or process that is configured to facilitate folding of the enclosure housing 120. It will be understood that reference to first and second cards 122, 124 can constitute reference to individual, separate cards or a unitary card comprising first and second cards 122, 124. First and second cards 122, 124 can be fastened together using any manufacturing process consistent with the industry, including, but not limited to cold sealing, heat sealing, high frequency sealing, radio frequency sealing, adhesives, or fasteners.

Either the first card 122, the second card 124, or both the first card 122 and the second card 124 can have an aperture 126 that can be appropriately sized and configured to help secure and display the object 102 that is placed within the reusable blister pouch 110. For example, the reusable blister pouch 110 can be placed between the first card 122 and the second card 124 such that when the first card 122 and the second card 124 are fastened together, the object 102 within the reusable blister pouch 110 can be positioned and displayed within the aperture 126. Furthermore, as will be appreciated by one of skill in the art, by positioning the object 102 within the reusable blister pouch 110 and within the aperture 126 when the first card 122 and the second card 124 are fastened together, the object 102 can be secured in place and prevented from sliding or otherwise moving out of place. Similarly, because the first card 122 and the second card 124 are fastened around the reusable blister pouch 110, the reusable blister pouch 110 and the object are prevented from being removed from the blister package assembly 100 unless the first card 122 and the second card 124 are torn, damaged, or otherwise unfastened.

Figure 2:
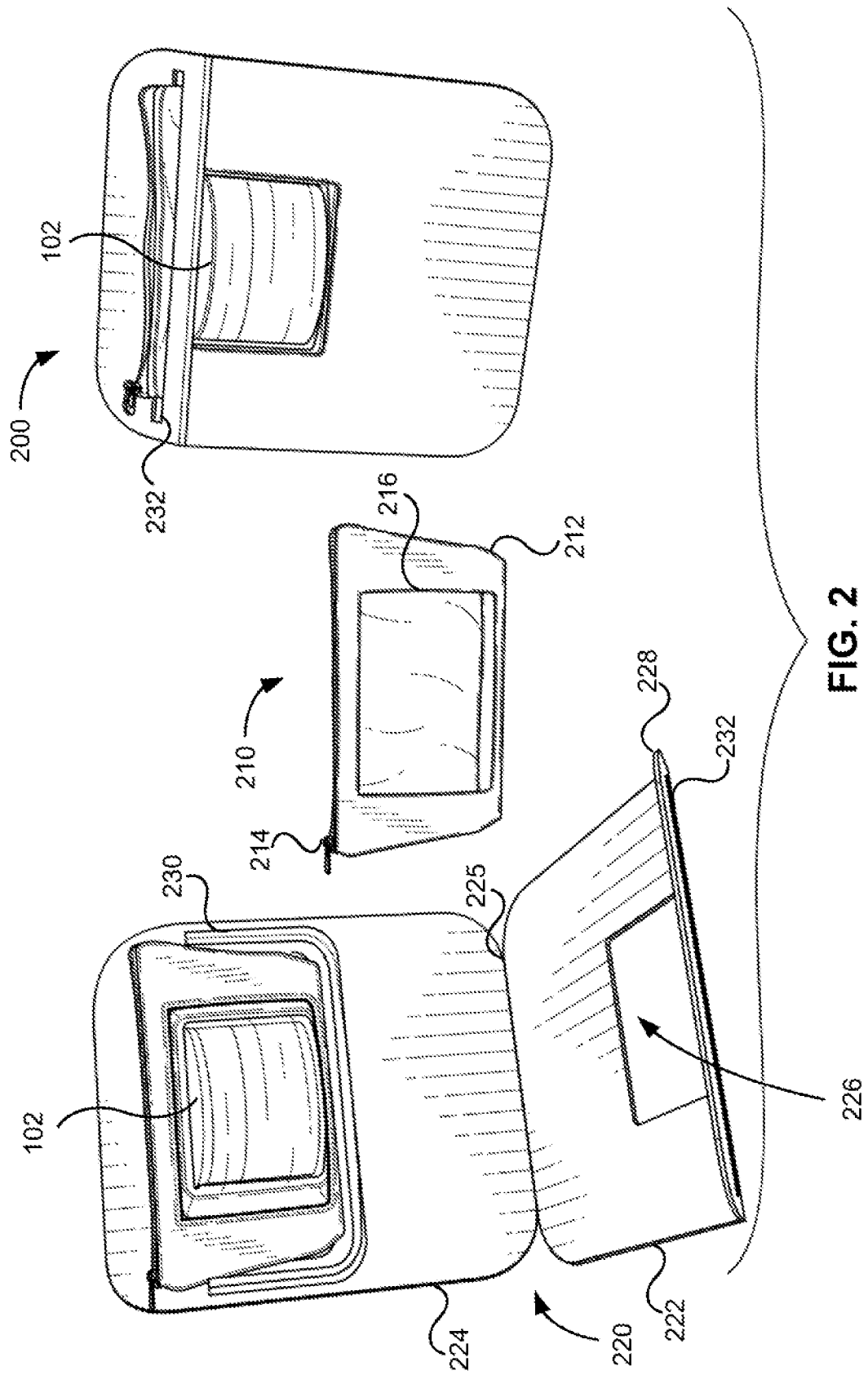
FIG. 2 is a blister package assembly having a reusable blister pouch and a display slot, in accordance with the disclosed technology.

As illustrated in FIG. 2, the disclosed technology can include a blister package assembly 200 having a reusable blister pouch 210 with a transparent window 216. Unless the context dictates otherwise, the blister package assembly 200 can include all the features previously described in relation FIG. 1. The transparent window 216 can be configured to display the object 102 inside of the reusable blister pouch 210. For example, rather than being made from a transparent material like reusable blister pouch 110, the reusable blister pouch 210 can include a pouch 212 that is made of opaque material and further includes a transparent window 216 that is made from transparent material or open mesh material. The transparent window 216 can be sized to display at least a portion of the object stored within the reusable blister pouch 210. The transparent window 216 can also be sized to align with the aperture 226 of the enclosure housing 220. The transparent window 216 can be fastened to the pouch 212 using any suitable manufacturing method consistent with the industry including, but not limited to stitches, staples, adhesives, heat welding, high frequency sealing, radio frequency sealing, fasteners, or any other suitable manufacturing method.

The first card 222 can include a foldable tab 228, a support ridge 230, and a slot 232 that can each be configured to help secure the reusable blister pouch 210 in the enclosure housing 220. The foldable tab 228 can be sized to align against the second card 224 and to help provide a surface whereon the first card 222 and the second card 224 can be fastened. For example, the foldable tab 228 can be located near a top portion of the first card 222 such that the foldable tab 228 can bend back toward the second card 224 when the enclosure housing 220 is assembled.

The support ridge 230 can be a portion of material that protrudes from one of the first card 222 or second card 224 and is sized to receive and secure the reusable blister pouch 210. For example, the support ridge 230 can be a portion of a card (e.g., 222 or 224) that is stamped, bent, cut, or otherwise caused to protrude from the card to provide additional support to the reusable blister pouch 210. Alternatively, or in addition, the support ridge 230 can be an additional piece of material fastened to the card to form a protrusion to provide additional support to the reusable blister pouch 210. For example, the support ridge 230 can be a piece of the same material as the card to which it is adhered, fastened, press-fit, welded, or otherwise secured.

The slot 232 can be a portion of material that is removed from the card opposite the card having the support ridge 230 and can be sized such that at least a portion of the reusable blister pouch 210 can protrude or extend through the slot 232 when the blister package assembly 200 is assembled. As will be appreciated by one of skill in the art, by protruding or extending the reusable blister pouch 210 through the slot 232, a consumer can observe and appreciate that the blister package assembly 200 includes a reusable blister pouch 210 that can be reusable for other purposes. Furthermore, by protruding or extending at least a portion of the reusable blister pouch 210 through the slot 232, the reusable blister pouch 210 can be further prevented from sliding or otherwise moving from side to side when secured between the first card 222 and the second card 224.

Figure 3:
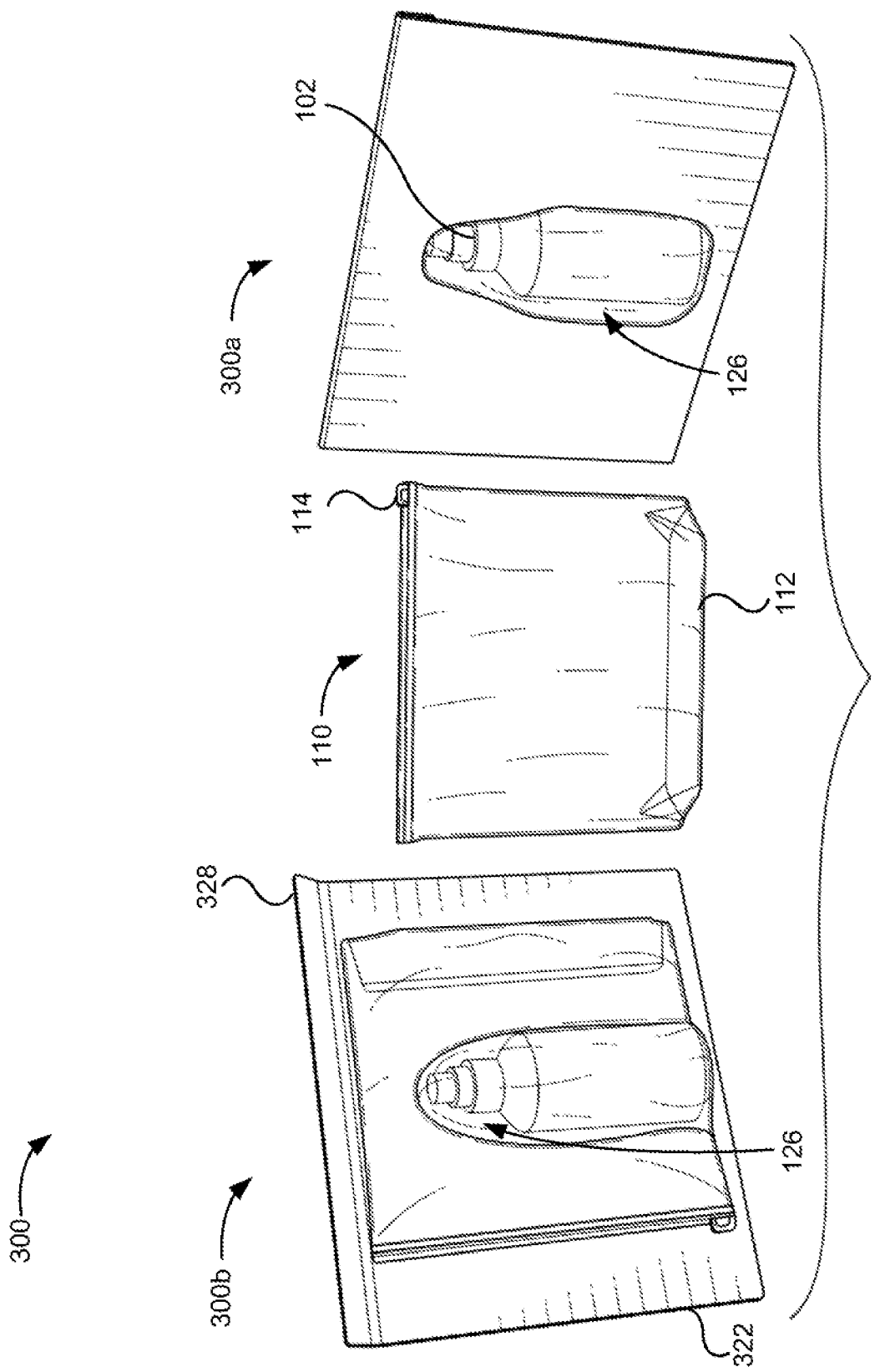
FIG. 3 is a blister package assembly having a reusable blister pouch and a single card, in accordance with the disclosed technology.

Whereas FIG. 2 illustrates a two-card (or folding unitary card) construction, FIG. 3 illustrates a blister package assembly 300 constructed from a single card 322, which can be referred to as a single-side blister package assembly. Unless the context dictates otherwise, the single-side blister package assembly 300 can include all or some of the same features previously described in relation FIGS. 1 and 2. Although illustrated as including the transparent reusable blister pouch 110 as described in relation to FIG. 1, the blister package assembly 300 alternatively can include the reusable blister pouch 210 having an opaque pouch 112 and a transparent window 216 as described in relation to FIG. 2. The single card 322 can include a foldable tab 328 (as shown from a back view of the single-side blister package assembly 300b) that is configured to be folded over the reusable blister pouch 110 to secure the reusable blister pouch 110 in the blister package assembly 300 (as shown from a front view of the single-side blister package assembly 300a). For example, when the blister package assembly 300 is assembled, the foldable tab 328 can be folded on top of at least a portion of the reusable blister pouch 110 and secured in place such that the reusable blister pouch 110 is fastened to the single card 322. In this example, the reusable blister pouch 110 can be secured to the single card 322 with only the foldable tab 328. For example, the reusable blister pouch 110 can be fastened to the single card 322 by fastening the foldable tab 328 over the blister pouch 110 by using any manufacturing method consistent with the industry including, but not limited to stitches, staples, adhesives, heat welding, high frequency sealing, radio frequency sealing, fasteners, or any other suitable manufacturing method. In some examples, the foldable tab 328 can include a perforated score line and/or a strip that can be torn to facilitate release of the reusable blister pouch 110. Alternatively, or in addition, the reusable blister pouch 110 can be removably fastened to the single card 322 itself In this example, the reusable blister pouch can be secured to the single card 322 by the foldable tab 328 as well as being removably fastened to the single card 322 itself. For example, the reusable blister pouch 110 can be fastened to the single card 322 itself by using any manufacturing method consistent with the industry including, but not limited to stitches, staples, adhesives, heat welding, high frequency sealing, radio frequency sealing, fasteners, or any other suitable manufacturing method.

Figure 4:
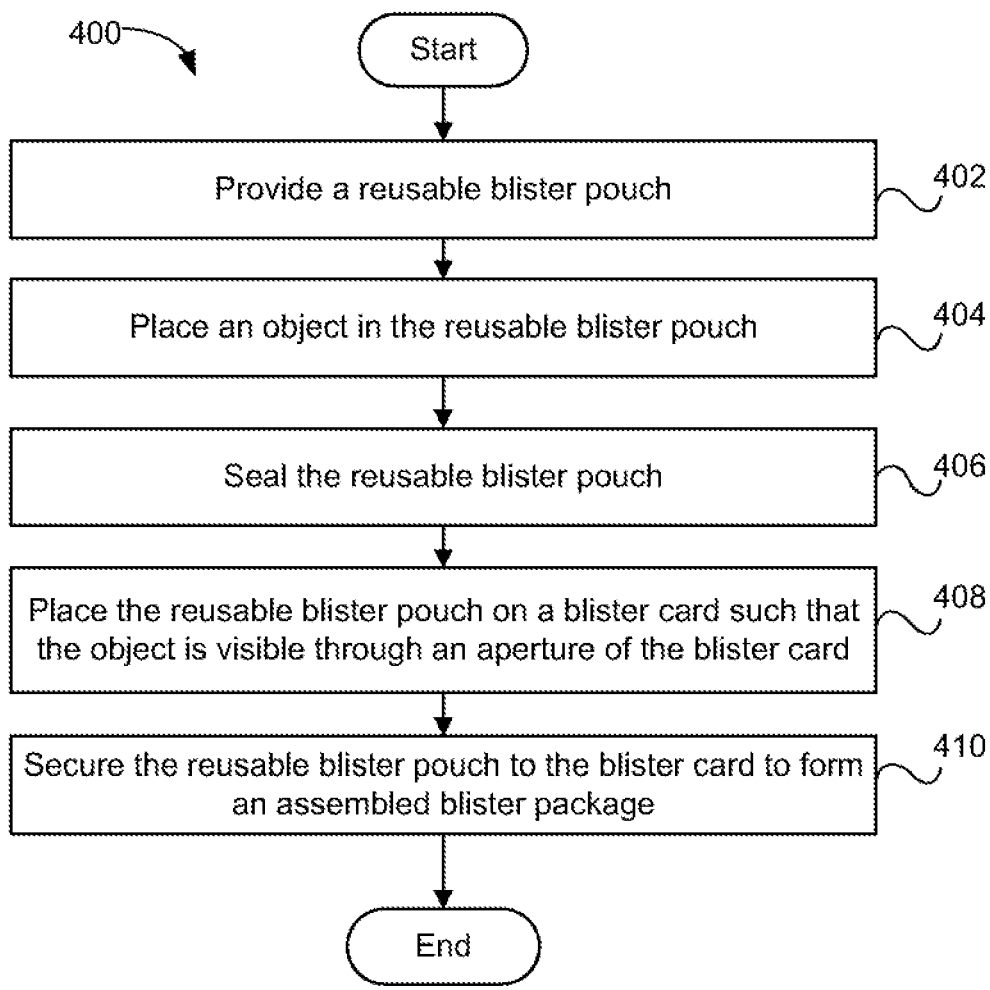
FIG. 4 is a method of assembling a blister package assembly, in accordance with the disclosed technology.

FIG. 4 illustrates a method 400 of assembling a blister package assembly, in accordance with the disclosed technology. The method 400 can include providing 402 a reusable blister pouch (e.g., reusable blister pouch 110 or 210) and placing 404 an object (e.g., object 102) within the reusable blister pouch. The method 400 can include sealing 406 the reusable blister pouch using any of the methods herein described (e.g., a zipper (press- or slide-type zippers), a hook and loop fastener (such as Velcro®, touch fastener, hook-and-pile fastener, Slidingly Engaging Fastener, Dual Lock®, Duotec®, etc.), a snap fastener, a press fit, straps, buttons, magnets, spring bands, flap tucking, a snap-fit connector, sticky tape or other sticky material, female to male connectors, hooks, a belt and buckle, a drawstring, etc.). The method 400 can include placing 408 the reusable blister pouch on a blister card such that at least a portion of the object is visible through an aperture of the blister card. The method 400 can further include securing 410 the reusable blister pouch to the blister card to form an assembled blister package. Securing 410 the reusable blister pouch to the blister card can include any of the method herein described, including, but not limited to fastening two blister cards together with the reusable blister pouch placed between them, folding over a foldable table to secure the reusable blister pouch in place, and/or fastening the blister pouch to the card. Furthermore, as will be appreciated by one of skill in the art, the reusable blister pouch can be secured 410 to the card such that the card may be damaged when the reusable blister pouch is removed from the card but the reusable blister pouch is not damaged.

As will be appreciated, the method 400 just described can be varied in accordance with the various elements and implementations described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method and at least some elements or steps of a second method.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. In various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A packaging container comprising:
   a card defining an opening; and
   a reusable blister pouch, secured to the card and configured to enclose an object, the reusable blister pouch comprising a fastener configured to transition the reusable blister pouch between an open configuration and a closed configuration, the reusable blister pouch is at least partially composed of an opaque material and the reusable blister pouch further comprises a transparent window configured to display at least a portion of the object,
   wherein the opening of the card is configured to display at least a portion of the reusable blister pouch, the reusable blister pouch extending at least partially through the opening and supported by the opening.

2. The packaging container of claim 1, wherein at least a portion of the reusable blister pouch comprises one or more transparent materials configured to display at least a portion of the object.

3. The packaging container of claim 1, wherein the card is at least partially composed of paper material.

4. The packaging container of claim 1, wherein the fastener of the reusable blister pouch comprises a zipper.

5. The packaging contain of claim 1, wherein the card is a first card and the packaging container further comprises a second card, the second card opposed to and separably joinable to the first card,
wherein the reusable blister pouch is secured between the opposing first and second cards when the first and second cards are in a joined configuration.

6. The packaging container of claim 5, wherein the first and second cards are constructed from a continuous piece of material and are joined by a hinge such that the first and second cards can be folded along the hinge to form an enclosure housing.

7. A packaging container comprising:
an enclosure housing comprising:
a first card; and
a second card, the second card opposed to and separably joinable to the first card; and
a reusable blister pouch configured to enclose an object, the reusable blister pouch comprising a fastener configured to transition the reusable blister pouch between an open configuration and a closed configuration, the reusable blister pouch is at least partially composed of an opaque material and the reusable blister pouch further comprises a transparent window configured to display at least a portion of the object,
wherein the reusable blister pouch is secured between the opposing first and second cards when the first and second cards are in a joined configuration, and
wherein at least one of the first card or the second card of the enclosure housing defines an opening configured to display at least a portion of the reusable blister pouch, the reusable blister pouch extending at least partially through the opening and supported by the opening.

8. The packaging container of claim 7, wherein at least a portion of the reusable blister pouch comprises one or more transparent materials configured to display at least a portion of the object.

9. The packaging container of claim 7, wherein the first and second cards are constructed from a continuous piece of material and are joined by a hinge such that the first and second cards can be folded along the hinge to form the enclosure housing.

10. The packaging container of claim 7, wherein the fastener of the reusable blister pouch comprises a zipper.

11. The packaging container of claim 7, wherein the fastener of the reusable blister pouch comprises a snap fastener.

12. A packaging container comprising:
an enclosure housing comprising:
a first card; and
a second card, the second card opposed to and separably joinable to the first card,
wherein at least one of the first card and the second card define an aperture of the enclosure housing;
a reusable blister pouch positioned within the aperture of the enclosure housing and extending at least partially through the aperture of the enclosure housing, the reusable blister pouch comprising an inner cavity and a fastener, the fastener configured to transition the reusable blister pouch between an open configuration and a closed configuration; and
an object positioned within the inner cavity of the reusable blister pouch, at least partially positioned within the aperture of the enclosure housing, and extending at least partially through the aperture of the enclosure housing such that the object is at least partially supported by the enclosure housing,
wherein the reusable blister pouch is at least partially composed of an opaque material and the reusable blister pouch further comprises a transparent window configured to display at least a portion of the object.

13. The packaging container of claim 12, wherein the first and second cards of the enclosure housing are joined around the reusable blister pouch and secure the reusable blister pouch such that the object is at least partially positioned within the aperture of the enclosure housing.

14. The packaging container of claim 13, wherein at least a portion of the reusable blister pouch comprises one or more transparent materials configured to display at least a portion of the object.

15. The packaging container of claim 12, wherein the first and second cards comprise a continuous piece of material configured to foldably join the first and second cards to form the enclosure housing.

16. The packaging container of claim 12, wherein the fastener of the reusable blister pouch comprises a zipper.

* * * * *